US010956412B2

(12) United States Patent
Wood et al.

(10) Patent No.: US 10,956,412 B2
(45) Date of Patent: Mar. 23, 2021

(54) METHOD AND SYSTEM FOR CONJUNCTIVE NORMAL FORM ATTRIBUTE MATCHING IN A CONTENT CENTRIC NETWORK

(71) Applicant: CISCO TECHNOLOGY, INC., San Jose, CA (US)

(72) Inventors: Christopher A. Wood, San Francisco, CA (US); Ignacio Solis, Scotts Valley, CA (US); Marc E. Mosko, Santa Cruz, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 944 days.

(21) Appl. No.: 15/232,674

(22) Filed: Aug. 9, 2016

(65) Prior Publication Data
US 2018/0046667 A1  Feb. 15, 2018

(51) Int. Cl.
*G06F 16/22* (2019.01)
*G06F 16/245* (2019.01)
(Continued)

(52) U.S. Cl.
CPC ............ *G06F 16/245* (2019.01); *G06F 16/22* (2019.01); *G06F 16/901* (2019.01);
(Continued)

(58) Field of Classification Search
CPC .................................................. G06F 16/245
See application file for complete search history.

(56) References Cited

U.S. PATENT DOCUMENTS 817,441 A    4/1906  Niesz
4,309,569 A  1/1982  Merkle
(Continued)

FOREIGN PATENT DOCUMENTS

DE  1720277 A1   6/1967
DE  19620817 A1  11/1997
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Apu M Mofiz
*Assistant Examiner* — Farhad Agharahimi

(57) ABSTRACT

One embodiment provides a system that facilitates a flexible strategy for matching content objects and interests. During operation, the system receives, by a computing device, an interest which includes a set of attributes, wherein a respective attribute has one or more values. In response to not obtaining a matching entry for the interest in a pending interest table, the system adds to the pending interest table a first entry which indicates the interest based on the attributes and their values. The system determines whether a received content object satisfies the interest indicated in the first entry based on the attributes of the first entry and attributes of the content object. In response to determining that the content object satisfies the interest, the system forwards the content object, thereby facilitating a flexible strategy for matching content objects to interests.

20 Claims, 9 Drawing Sheets

(51) Int. Cl.
   *G06F 16/901*  (2019.01)
   *H04L 29/08*   (2006.01)
   *H04L 12/00*   (2006.01)
   *H04L 29/00*   (2006.01)

(52) U.S. Cl.
   CPC .......... *G06F 16/9017* (2019.01); *H04L 12/00* (2013.01); *H04L 29/00* (2013.01); *H04L 67/1097* (2013.01)

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,044,075 A * | 3/2000 | Le Boudec ............ H04L 45/00 370/234 |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |

(56) References Cited

U.S. PATENT DOCUMENTS

| | | | |
|---|---|---|---|
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0083505 A1* | 4/2007 | Ferrari ................ G06F 16/954 |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0282779 A1* | 12/2007 | Haimov ................ G06N 5/02 706/57 |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |

(56) References Cited

U.S. PATENT DOCUMENTS

| | | |
|---|---|---|
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson ............... H04L 45/00 370/392 |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |

(56) References Cited

U.S. PATENT DOCUMENTS

| | | |
|---|---|---|
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0164552 A1* | 6/2014 | Kim ............... H04L 67/2842 709/214 |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1* | 9/2014 | Varvello ............... H04L 67/327 709/223 |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1* | 10/2014 | You ................. H04L 45/7453 370/392 |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2016/0182368 A1* | 6/2016 | Azgin .................. H04L 45/58 370/331 |
| 2017/0142226 A1* | 5/2017 | De Foy ............. H04L 45/7453 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |

(56) References Cited

FOREIGN PATENT DOCUMENTS

| | | |
|---|---|---|
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (Infocom Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—Crypto 2001, vol. 2139, Springer Berlin Heidelberg (2001).
D.K. Smetters, P. Golle, and J.D. Thornton, "CCNx access control specifications," Parc, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.

(56) References Cited

OTHER PUBLICATIONS

Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012}.
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.

(56) References Cited

OTHER PUBLICATIONS

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.

(56) References Cited

OTHER PUBLICATIONS

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

International Search Report and Written Opinion in corresponding International Application No. PCT/US2017/043833, dated Sep. 13, 2017, 10 pages.

* cited by examiner

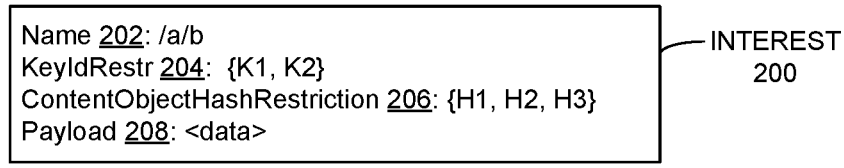
FIG. 2A
FIG. 2B
|  | Name 242 | KeyIdRestr 244 | ContObjHashRestr 246 | Arrival Interfaces 248 |
|---|---|---|---|---|
| 240.1 | /a/b | {K1} | {H1, H4} | {IF_102, IF_108, ...} |
| 240.2 | /a/b | {K1, K2} | {H1, H2, H3} | {IF_102, ...} |
| 240.3 | /c/d | {K5} | {H5} | {IF_108, IF_112, ...} |
|  | ... | ... | ... | ... |
PENDING INTEREST TABLE 240
FIG. 2C

METHOD AND SYSTEM FOR CONJUNCTIVE NORMAL FORM ATTRIBUTE MATCHING IN A CONTENT CENTRIC NETWORK

RELATED APPLICATION

The subject matter of this application is related to the subject matter in the following applications:
- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");
- U.S. Pat. No. 8,204,060, entitled "METHOD AND SYSTEM FOR FACILITATING FORWARDING A PACKET IN A CONTENT-CENTRIC NETWORK," by inventors Van Jacobson and James D. Thornton, filed 17 Dec. 2009 (hereinafter "U.S. Pat. No. 8,204,060");
- U.S. Pat. No. 8,386,622, entitled "METHOD AND APPARATUS FOR FACILITATING COMMUNICATION IN A CONTENT CENTRIC NETWORK," by inventor Van L. Jacobson, filed 11 Dec. 2008 (hereinafter "U.S. Pat. No. 8,386,622"); and
- U.S. patent application Ser. No. 14/337,026, entitled "SYSTEM FOR DISTRIBUTING NAMELESS OBJECTS USING SELF-CERTIFYING NAMES," by inventor Marc E. Mosko, filed 14 Jul. 2014 (hereinafter "U.S. patent application Ser. No. 14/337,026");

the disclosures of which are herein incorporated by reference in their entirety.

BACKGROUND

Field

This disclosure is generally related to distribution of digital content. More specifically, this disclosure is related to a method and system for matching interests and content objects in a content centric network based on matching conjunctive normal form predicates of arbitrary attribute-based restrictions.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients and consumers, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

An interest can include a name and two optional limiting restrictions for a responsive content object. The first restriction is a key identifier restriction ("KeyIdRestr"), which limits a responsive content object to one which is signed with a key identifier in a validation algorithm field ("ValidationAlgorithm KeyId") equal to the KeyIdRestr. The second restriction is a content object hash value restriction ("ObjHashRestr"), which limits a responsive content object to one where a cryptographic hash of the entire named payload is equal to the ObjHashRestr. A current version of the CCNx Semantics is available at https://datatracker.ietf.org/doc/draft-irtf-icnrg-ccnxsemantics/(hereinafter "CCNx Semantics," which disclosure is herein incorporated by reference in its entirety. Furthermore, a content object may or may not include a name and a key identifier, while a cryptographic hash may always be performed on the payload of the content object (i.e., to obtain a comparison value for matching against an ObjHashRestr of a pending interest). Nameless content objects are described in U.S. patent application Ser. No. 14/337,026.

Thus, a content object satisfies or matches an interest if and only if: (a) the content object name, if present, exactly matches the interest name; (b) a key identifier of the content object exactly equals a KeyIdRestr of the interest, if present; and (c) a computed hash of the content object exactly equals the ObjHashRestr of the interest, if present. However, the current CCN protocol does not allow an interest to express multiple restrictions for a single attribute (such as the KeyIdRestr or the ObjHashRestr). Nor does the current CCN protocol allow an interest to express one or more restrictions (or values) for other attributes.

SUMMARY

One embodiment provides a system that facilitates a flexible strategy for matching content objects and interests. During operation, the system receives, by a computing device, an interest which includes a set of attributes, wherein a respective attribute has one or more values. In response to not obtaining a matching entry for the interest in a pending interest table, the system adds to the pending interest table a first entry which indicates the interest based on the attributes and their values. The system determines whether a received content object satisfies the interest indicated in the first entry based on the attributes of the first entry and attributes of the content object. In response to determining that the content object satisfies the interest, the system forwards the content object, thereby facilitating a flexible strategy for matching content objects to interests.

In some embodiments, the interest has a name, obtaining or not obtaining the matching entry in the pending interest table is based on the name for the interest, and the received content object has a same name as the name for the interest. The system receives the content object and performs a lookup in the pending interest table based on the name for the content object to obtain the first entry.

In some embodiments, in response to obtaining the matching entry for the interest in the pending interest table based on the name for the interest, the system performs the following operations: in response to determining, for each attribute indicated in the matching entry, that the values of a respective attribute indicated in the matching entry exactly match all of the values of the corresponding attribute of the interest, the system adds an arrival interface associated with the interest to a list of arrival interfaces for the matching entry; and in response to determining, for each attribute indicated in the matching entry, that the values of a respective attribute indicated in the matching entry do not exactly match all of the values of the corresponding attribute of the interest, the system adds to the pending interest table the first entry.

In some embodiments, the system determines that the content object satisfies the interest by determining, for each attribute indicated in the first entry, that a value of the corresponding attribute of the content object matches one of the values of a respective attribute indicated in the first entry.

In some embodiments, the system determines that the content object satisfies the interest by performing a calculation based on a conjunctive normal form, wherein a respective attribute comprises an AND clause, and wherein the values for the respective attribute comprise predicates of an OR clause.

In some embodiments, in response to determining that the content object does not satisfy the interest, the system performs one or more of the following operations: stores the content object in a local cache or content store; refrains from forwarding the content object to a downstream node; discards the content object; and performs an action based on a policy of the computer system.

In some embodiments, an attribute is one or more of: a name for the interest or the content object, wherein a name is a hierarchically structured variable length identifier that includes contiguous name components ordered from a most general level to a most specific level; a key identifier restriction associated with the interest and applicable to a responsive content object; a key identifier associated with the content object; a content object hash restriction associated with the interest and applicable to the responsive content object; a hash of the content object; a hop count or limit associated with the interest or the content object; and any field of the interest, the content object, or a message in a content centric network.

In some embodiments, in response to receiving the interest, the system performs a lookup in a content store or local cache of the computing device for a matching content object. In response to determining, for each respective attribute indicated in the interest, that a value of an attribute of the matching content object matches one of the values of a corresponding respective attribute of the interest, the system forwards the content object.

Another embodiment provides a system that facilitates a flexible strategy for matching content objects and interests. During operation, the system generates an interest which includes a set of attributes, wherein a respective attribute has one or more values. The system determines that a received content object satisfies the interest based on a matching entry in a pending interest table and further based on attributes of the matching entry and attributes of the received content object. The system removes the matching entry from the pending interest table, thereby facilitating a flexible strategy for matching content objects and interests.

In some embodiments, the system creates the matching entry in the pending interest table, wherein the matching entry indicates the interest based on the attributes and their values.

In some embodiments, the interest has a name that is a hierarchically structured variable length identifier comprised of contiguous name components ordered from a most general level to a most specific level.

In some embodiments, in response to transmitting the interest, the system receives the content object. The system determines that the received content object satisfies the interest based on the matching entry by determining, for each attribute indicated in the matching entry, that a value of the corresponding attribute of the content object matches one of the values of a respective attribute indicated in the first entry.

BRIEF DESCRIPTION OF THE FIGURES

FIG. 2A presents an exemplary interest packet, in accordance with an embodiment of the present invention.

FIG. 2B presents an exemplary content object, in accordance with an embodiment of the present invention.

FIG. 2C presents an exemplary pending interest table, in accordance with an embodiment of the present invention.

In the figures, like reference numerals refer to the same figure elements.

DETAILED DESCRIPTION

Figure 1A:
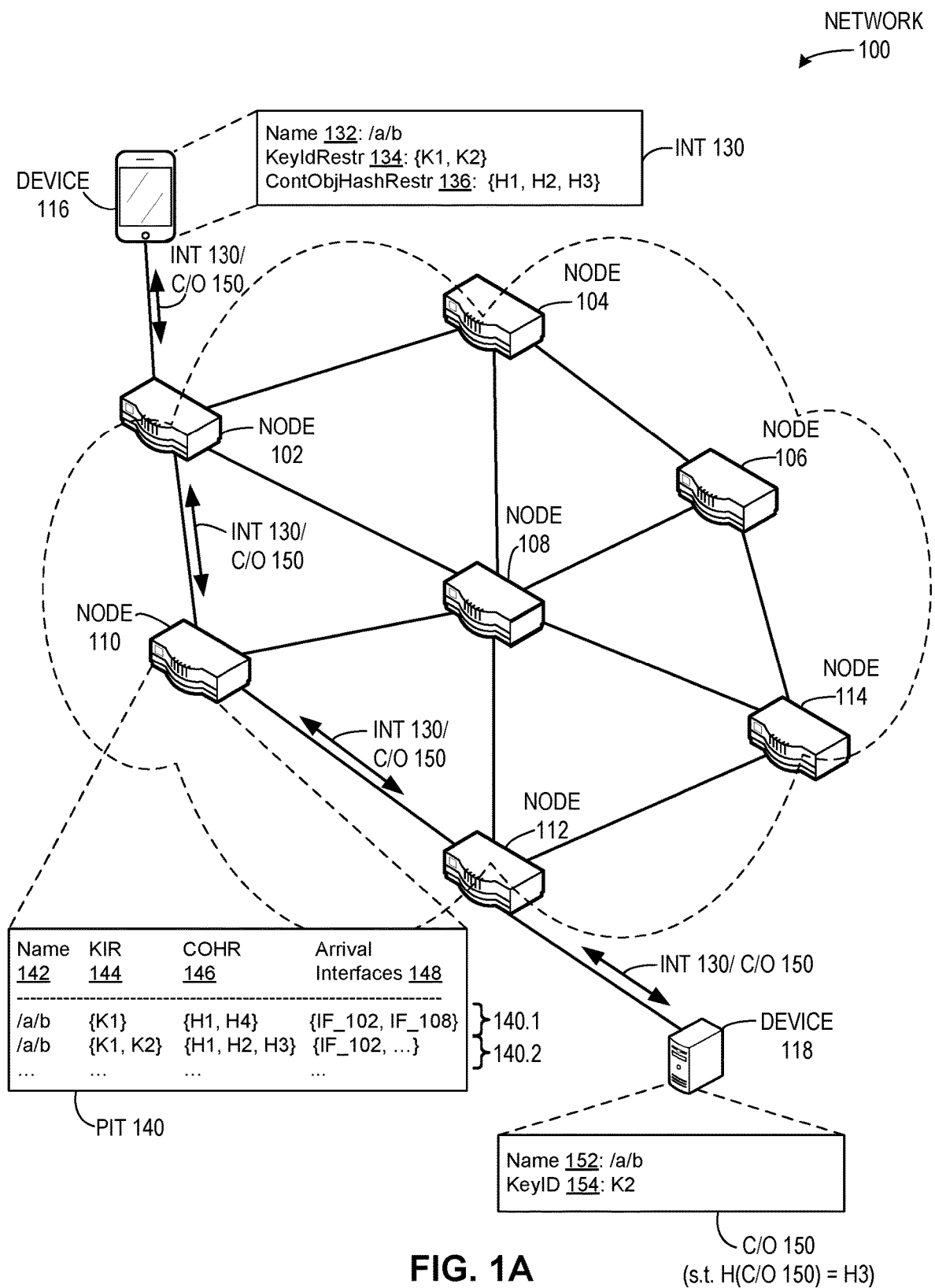
FIG. 1A illustrates an exemplary network that facilitates a flexible strategy for matching content objects to interests, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that allows a content-requesting node to request content based on multiple values for an attribute, which facilitates a flexible strategy for matching content objects to interest. Recall that a CCN interest can include a name and two optional limiting restrictions for a responsive content object. The first restriction is a key identifier restriction ("KeyIdRestr" or "KIR"), which limits a responsive content object to one which is signed with a key identifier in a validation algorithm field ("ValidationAlgorithm KeyId") equal to the KeyIdRestr. The second restriction is a content object hash value restriction ("ObjHashRestr" or "COHR"), which limits a responsive content object to one where a cryptographic hash of the entire named payload is equal to the ObjHashRestr. Furthermore, a CCN content object may or may not include a name and a key identifier, while a cryptographic hash may always be performed on the payload of the content object (i.e., to obtain a comparison value for matching against a COHR of a pending interest). Nameless content objects are described in U.S. patent application Ser. No. 14/337,026.

Thus, a content object satisfies or matches an interest if and only if: (a) the content object name, if present, exactly matches the interest name; (b) a key identifier of the content object exactly equals a KIR of the interest, if present; and (c) the computed COH exactly equals the COHR of the interest, if present. However, the current CCN protocol does not allow an interest to express multiple restrictions for a single attribute (such as the KIR or the COHR). Nor does the current CCN protocol allow an interest to express one or more restrictions (or values) for other attributes.

Embodiments of the present invention address these deficiencies by allowing a content requesting node (or a requestor) to transmit an interest with multiples values for an attribute. For example, a requestor may wish to express a COHR (i.e., the attribute) as both the SHA256 digest ("H1") and the SHA 512 digest ("H2") (i.e., the values) for a requested content object, such that either of values H1 or H2 is sufficient for a matching content object. The requestor may also wish to allow for the use of keys based on different key exchange algorithms, such that a KIR (i.e., the attribute) can be either of "K1" or "K2."

Assume that an interest attribute "A" (such as the COHR or the KIR) with multiple values ("n") can be expressed formally as the disjunction of multiple variables:

$$V_1^A \vee V_2^A \vee V_3^A \vee \ldots V_n^A \qquad \text{Formula (1)}$$

Thus, a corresponding attribute A of a content object matches the interest attribute A if the corresponding attribute A of the content object satisfies Formula (1). In the example above, if a content object has a value of H1 for its computed COH, that content object satisfies or matches the "restrictive" attribute of the exemplary interest (i.e., because H1 satisfies the clause "H1∨H2").

If an interest includes multiple restrictive attributes (with multiple values), then the content object must satisfy or match all of the restrictive attributes in the same manner. In other words, the corresponding attributes of the content object must match the conjunctive normal form ("CNF") of the attributes expressed in the interest. To continue the example above (where the KIR is K1 or K2, and where the COHR is H1 or H2), the corresponding CNF formula is as follows:

$$(K1 \vee K2) \wedge (H1 \vee H2) \qquad \text{Formula (2)}$$

A content object satisfies an interest with the attributes and values of Formula (2) if and only if both the KIR is K1 or K2 and if the COHR is H1 or H2. Thus, a content object with a key identifier which both indicates K2 and hashes to a COH value of H2 does satisfy Equation (2). On the other hand, a content object with a key identifier which indicates a value of "K4" (where K4 is not equal to either K1 or K2) does not satisfy Formula (2). Note that because the first clause is false, the entirety of Formula (2) is false.

Thus, embodiments of the present invention allow a first node (e.g., a content-requesting node) to provide information about requested content to a second node (e.g., an upstream intermediate router), whereby the first node generates and sends an interest with multiple values for potentially multiple attributes to the second node. This allows the second node to update its pending interest table (PIT) accordingly, such that the second node can process a subsequently received content object based on the updated PIT (e.g., by comparing the content object attributes with the stored PIT attributes based on a CNF formula).

Thus, these results provide improvements to the distribution of digital content, where the improvements are fundamentally technological. Embodiments of the present invention provide a technological solution to a technological problem, e.g., by providing information via an interest packet to an upstream router, which allows the upstream router to update its PIT and process a subsequently received content object based on the updated PIT. For example, Formula (2) above depicts an interest which expresses two possible COHR values, which allows the system to provide hash agility to content requesting nodes. The technological solution, which results in a more flexible system, addresses the technological problem of the efficient and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Environment

FIG. 1A illustrates an exemplary network 100 that facilitates a flexible strategy for matching content objects to interests, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110).

During operation, content requesting device 116 can generate and send an interest 130 with a name 132 of "/a/b," a key identifier restriction (KIR) 134 with a value of "{K1, K2}," and a content object hash restriction (COHR) 136 with a value of "{H1, H2, H3}." Each of name 132, KIR 134, and COHR 136 is an attribute of interest 130. Name 132 indicates one possible value for a matching content object, while KIR 134 and COHR 136 each indicate two possible values for a matching content object.

Interest 130 can travel through a network (such as a CCN) via nodes or routers 102, 110, and 112, finally reaching content producing device or producer 118. Upon receiving interest 130, an intermediate router such as node 110 can perform a lookup in its pending interest table 140 for a matching entry, and upon finding no matching entry, can add an entry 140.2 corresponding to interest 130. PIT 140 can include entries with a name 142, a KIR 144, a COHR 146, and a list of arrival or incoming interfaces 148. For example, entry 140.2 can include a name of "/a/b," a KIR with a value of "{K1, K2}," a COHR with a value of "{H1, H2, H3}," and a list of arrival interfaces "{IF_102, . . . }."

Subsequently, content producing device or producer 118 can generate and transmit a responsive content object 150 with a name 152 of "/a/b" and a key identifier 154 which indicates "K2." A hash of content object 150 yields the value "H3." In some embodiments, this hash value H3 is carried inside content object 150 or inside a header portion of an encapsulating packet. As content object 150 travels back to device 116, each receiving intermediate router (e.g., nodes 112, 110, and 102) can cache content object 150, and determine whether a matching entry exists in its PIT for the interest. For example, node 110 can receive content object 150, perform a lookup in its PIT 140 based on the name for the interest and the content object, and obtain matching entry 140.2.

Node 110 can also determine whether content object 150 satisfies the interest indicated in matching entry 140.2. To do this, node 110 can determine, for each attribute indicated in the matching entry, whether a value of the corresponding attribute of the content object matches one of the values of a respective attribute indicated in the matching entry. In other words, node 110 can perform a formula based on CNF, wherein the AND clauses are in the form of Formula (1): $(K1 \vee K2) \wedge (H1 \vee H2 \vee H3)$. If this formula evaluates to false, the content object does not match, and node 110 refrains from forwarding content object 150 (not shown). Node 110 can store content object 150 in a local cache or its content store (CS), or discard content object 150, or perform any action based on a policy of node 110. On the other hand, if the formula evaluates to true, the content object does match. Since content object 160 includes K2 and hashes to H3, the formula evaluates to true. Thus, node 110 can forward content object 150 via interface IF_102 and remove entry 140.2 from PIT 140.

Note that in some embodiments, a PIT lookup by node 110 based on the name may also return entry 140.1 (in addition to entry 140.2). The system can obtain each matching PIT entry and determine whether a received content object satisfies a matching PIT entry by evaluating the same CNF formula as described above. Processing an incoming content object is described in detail below in relation to FIGS. 3B and 4.

Figure 1B:
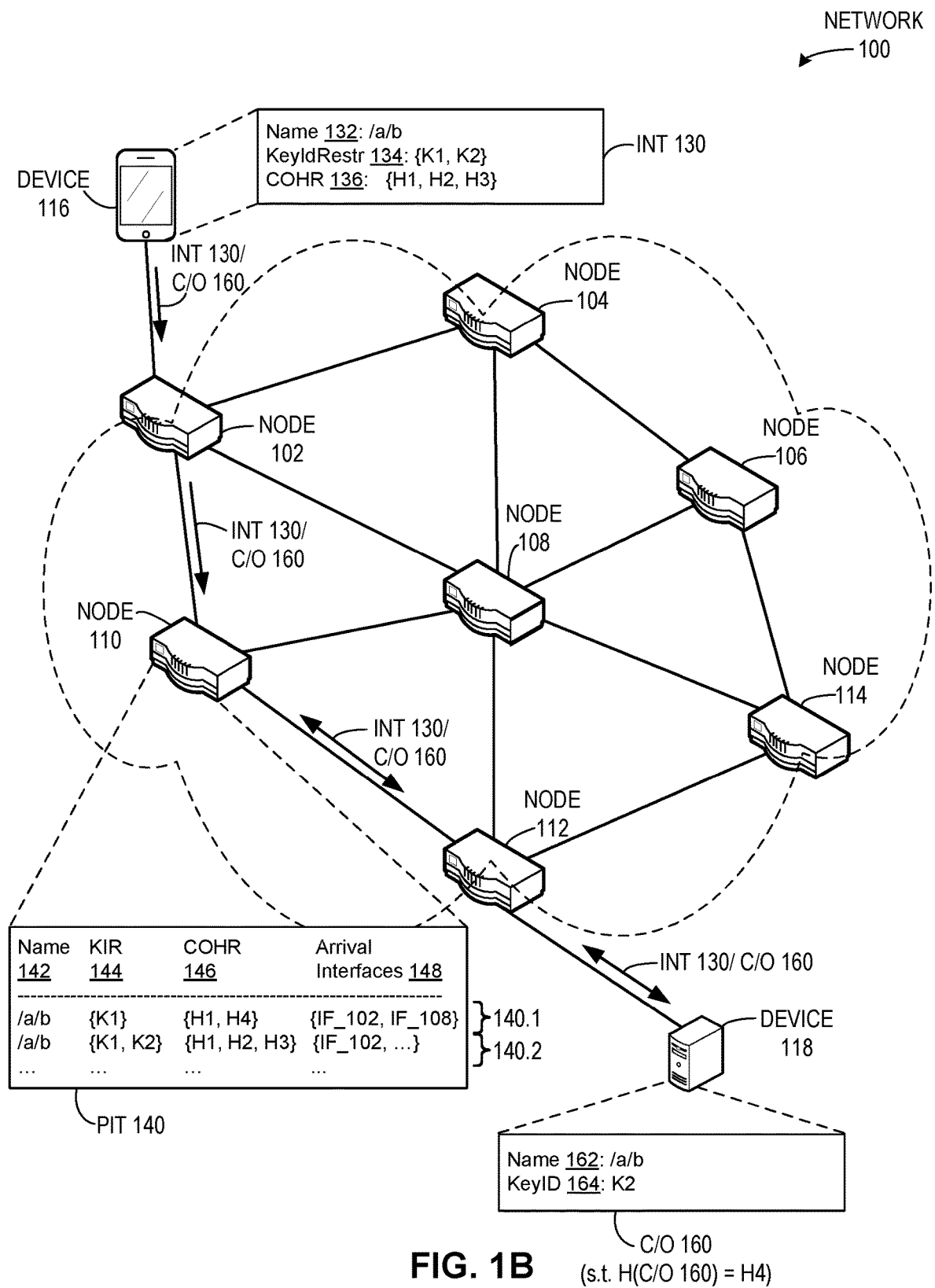
FIG. 1B illustrates an exemplary network that facilitates a flexible strategy for matching content objects to interests, in accordance with an embodiment of the present invention.

FIG. 1B illustrates an exemplary network 100 that facilitates a flexible strategy for matching content objects to interests, in accordance with an embodiment of the present invention. The communication in FIG. 1B is similar to the communication described above for FIG. 1A. However, instead of generating a content object 150, producer 118 generates a content object 160 with a name 162 of "/a/b" and a key identifier 154 which indicates "K2." A hash of content object 160 yields the value "H4." Content object 160 travels back through network 100, whereby each receiving intermediate router (e.g., 112, 110, and 102) can cache content object 160, and determine whether a matching entry exists in its PIT for the interest. For example, node 110 can receive content object 160, perform a lookup in its PIT 140 based on the name for the interest and the content object, and obtain matching entry 140.2. Node 110 can determine that the formula $(K1 \vee K2) \wedge (H1 \vee H2 \vee H3)$ evaluates to false for content object 160 which includes K2 and hashes to H4. Node 110 can refrain from forwarding content object 160. Node 110 may also cache content object 160 in a local cache or in its content store.

Figure 1C:
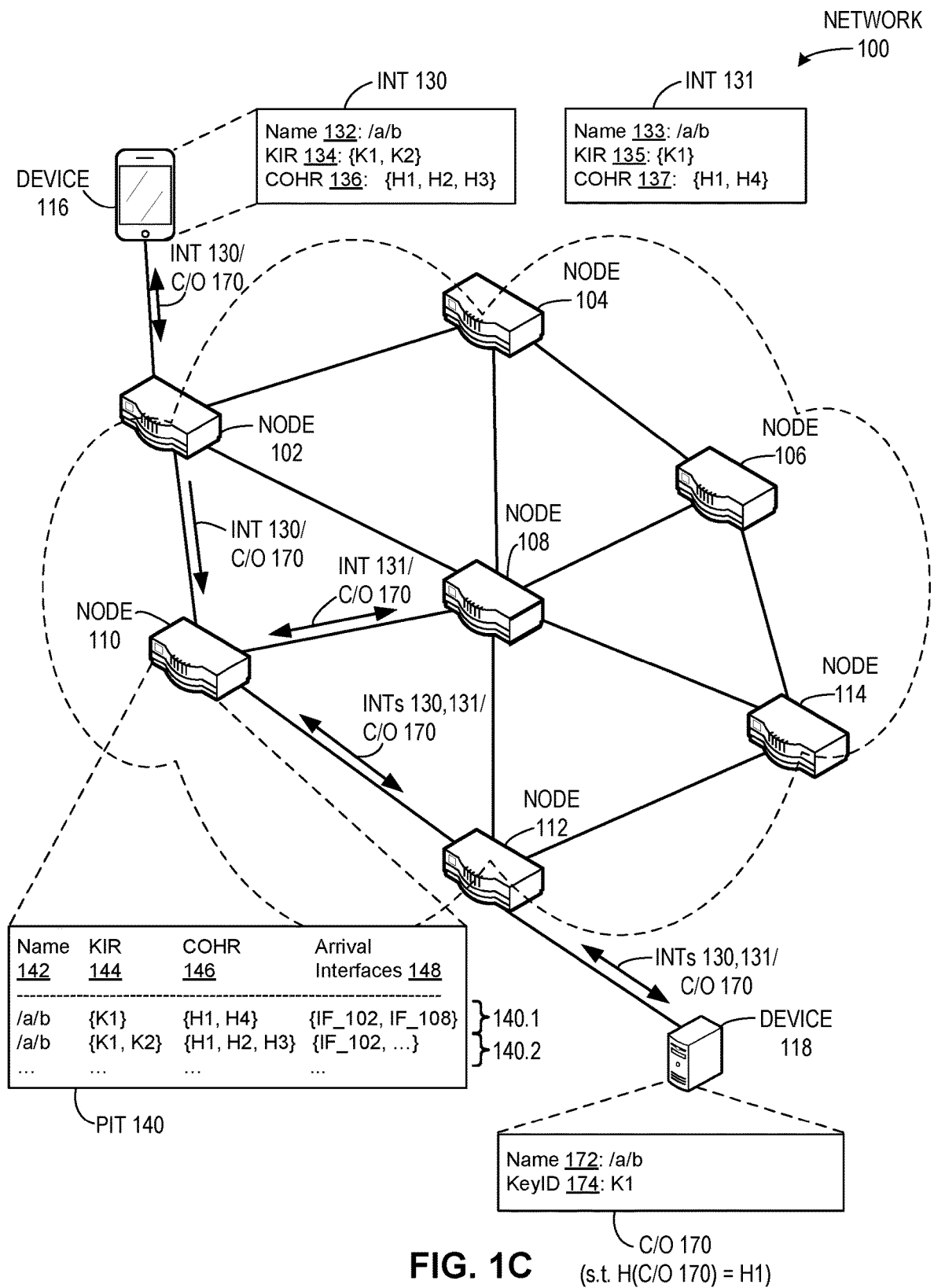
FIG. 1C illustrates an exemplary network that facilitates a flexible strategy for matching content objects to interests, in accordance with an embodiment of the present invention.

FIG. 1C illustrates an exemplary network 100 that facilitates a flexible strategy for matching content objects to interests, in accordance with an embodiment of the present invention. The communication in FIG. 1C is similar to the communication described above for FIG. 1A. However, instead of generating a content object 150, producer 118 generates a content object 170 with a name 172 of "/a/b" and a key identifier 154 which indicates "K1." A hash of content object 170 yields the value "H1." Furthermore, assume that node 110 has previously received (from a downstream node, including a content requesting device) an interest 131 with a name 133 of "/a/b," a KIR 135 with a value of "{K1}," and a COHR 137 with a value of "{H1, H4}." Also assume that node 110 has previously added an entry 140.1 to its PIT 140, corresponding to interest 131.

Content object 170 travels back through network 100, whereby each receiving intermediate router (e.g., nodes 112, 110, and 102) can cache content object 170, and determine whether a matching entry exists in its PIT for the interest. For example, node 110 can receive content object 170, perform a lookup in its PIT 140 based on the name for the interest and the content object, and obtain a first matching entry 140.1 from PIT 140. Node 110 can determine that the formula (K1)∧(H1∨H4) for entry 140.1 evaluates to true for content object 170 which includes K1 and hashes to H1. Thus, node 110 can forward content object 170 via interfaces IF_102 and IF_108, and remove entry 140.1 from PIT 140.

Node 110 can continue to search for matching PIT entries based on name 172 for received content object 170. For example, node 110 can also obtain a second matching entry 140.2 from PIT 140. Node 110 can determine that the formula (K1∨K2)∧(H1∨H2∨H3) for entry 140.2 also evaluates to true for content object 170 which includes K1 and hashes to H1. Thus, node 110 can forward content object 170 via interface IF_102, and remove entry 140.2 from PIT 140. In some embodiments, intermediate routers can perform a deduplication process on the arrival interfaces of matching entries. In other words, a content object which matches multiple entries with duplicate arrival interfaces is not forwarded more than once to a single interface. In the communication of FIG. 1C, node 110 can track or monitor that it previously forwarded a matching content object for entry 140.1, and, upon determining that a matching content object also satisfies entry 140.2, only forward the matching content object to the interfaces to which the matching content object has not previously been forwarded. This deduplication process allows node 110 to simply remove entry 140.2 from its PIT 140.

Thus, embodiments of the present invention provide a system that allows a content requesting device to express or indicate multiple values for multiple attributes, which results in corresponding updates to the PITs of intermediate routers in the network. The intermediate routers may, upon receiving a matching content object, determine whether the content object satisfies the attributes and values of a corresponding PIT entry. If it does, the intermediate routers can forward the content object and update the PIT as needed. If it does not, the intermediate routers can refrain from forwarding the content object. Thus, the system facilitates a flexible strategy for matching content objects to interests.

Exemplary Interest, Content Object, and Pending Interest Table

FIG. 2A presents an exemplary interest packet 200, in accordance with an embodiment of the present invention. Interest 200 can include a name 202 of "/a/b," a key identifier restriction (KIR) 204 with a value of "{K1, K2}," a content object hash restriction (COHR) 206 with a value of "{H1, H2, H3}," and a payload 208 with a value of "<data>." Each of name 202, KIR 204, and COHR 206 is an attribute of interest 200. An attribute may have one or more values. Name 202 indicates one possible value for a matching content object, while KIR 204 and COHR 206 each indicate two possible values for a matching content object.

FIG. 2B presents an exemplary content object 220, in accordance with an embodiment of the present invention. Content object 220 can include a name 222 of "/a/b," a key identifier 224 with a value of "{K1}," a payload 226 with a value of "<data>," and a content object hash ("COH") 226 with a value of "{H3}." In some embodiments, COH 228 is included as a field (as depicted in FIG. 2B). If a content object does not carry the COH as an expressed field, the COH must be calculated in network in order to compare against the COHR included in a previously transmitted interest (and as indicated in a corresponding PIT entry). In some embodiments, a border router can calculate the COH and carry the COH via trusted means within an autonomous system.

FIG. 2C presents an exemplary pending interest table 240, in accordance with an embodiment of the present invention. PIT 240 can include entries with a name 242, a KIR 244, a COHR 246, and a list of arrival or incoming interfaces 248. For example, entry 240.1 can include a name of "/a/b," a KIR with a value of "{K1}," a COHR with a value of "{H1, H4}," and a list of arrival interfaces "{IF_102, IF_108, ... }." Entry 240.2 can include a name of "/a/b," a KIR with a value of "{K1,K2}," a COHR with a value of "{H1,H2,H3}," and arrival interfaces "{IF_102, ... }." Entry 240.3 can include a name of "/c/d," a KIR with a value of "{K5}," a COHR with a value of "{H5}," and arrival interfaces "{IF_108, IF_112, ... }."

Interests may be aggregated in a pending interest table based on current schemes, including: aggregating, collapsing, or suppressing a "similar" interest based on attribute sameness; forwarding subsequent similar interests from a same previous hop as a retransmission request; aggregating subsequent similar interests from a new previous hop; adding an arrival interface of a subsequent similar interest based on the above schemes; and processing an interest based on an expiration time for the interest. This functionality is described in detail in CCNx Semantics. In embodiments of the present system, an entity (e.g., an intermediate router or other device with a forwarder) may aggregate "similar" interests in its pending interest table only when all values of all attributes of a pending interest match all values of all attributes of another pending interest.

Intermediate Router or Other Forwarding Device Processes an Interest

Figure 3A:
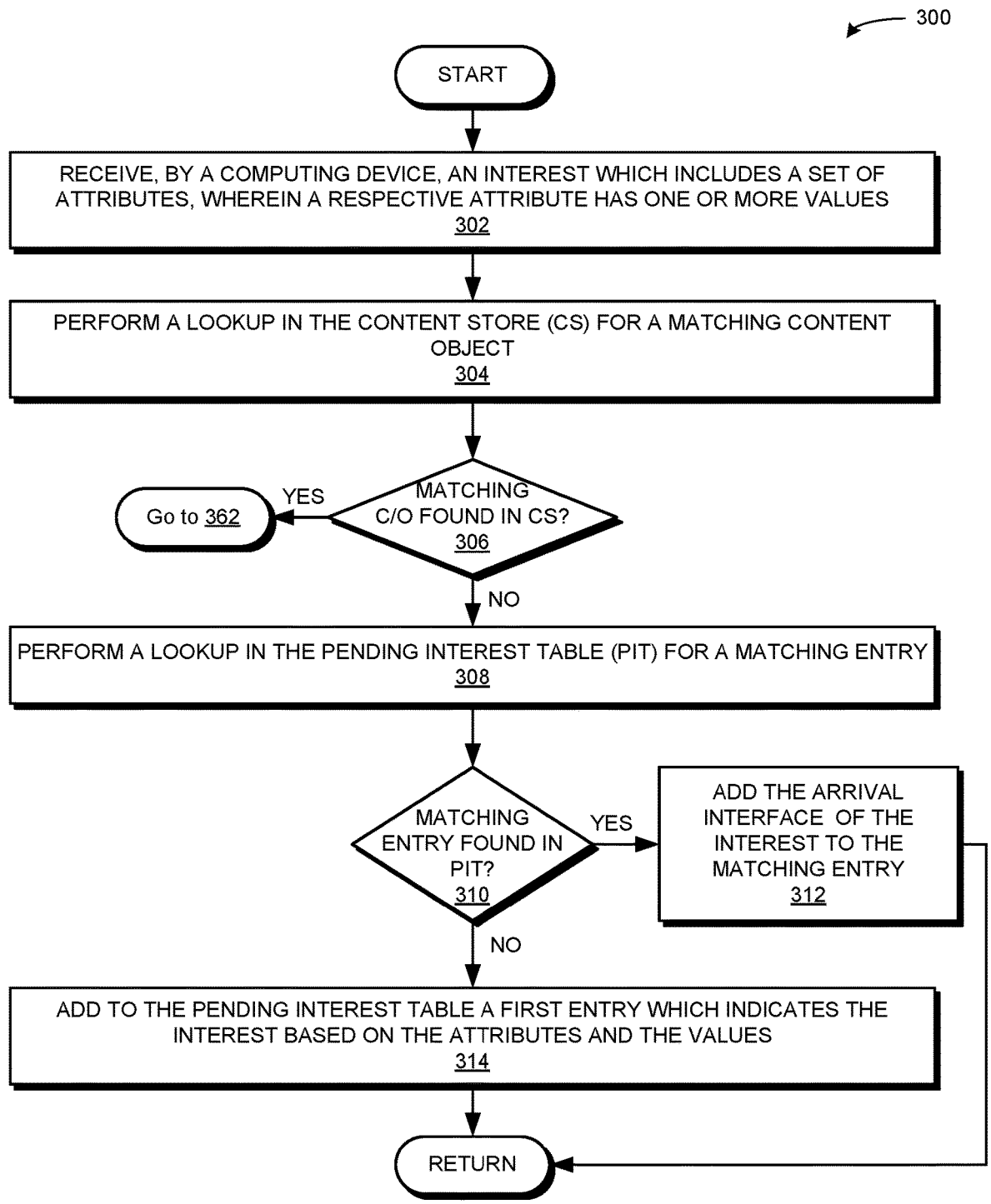
FIG. 3A presents a flow chart illustrating a method for facilitating a flexible strategy for matching content objects to interests, including processing an incoming interest, in accordance with an embodiment of the present invention.

FIG. 3A presents a flow chart 300 illustrating a method for facilitating a flexible strategy for matching content objects to interests, including processing an incoming interest, in accordance with an embodiment of the present invention. During operation, the system receives, by a computing device, an interest which includes a set of attributes, wherein a respective attribute has one or more values (operation 302). The system performs a lookup in the content store (CS) or local cache for a matching content object (operation 304). If a matching content object is found in the CS (decision 306), the operation continues at operation 362 of FIG. 3B (forwarding the content object to one or more arrival interfaces indicated in a matching PIT entry). The system can determine the arrival interfaces via which to forward the matching content object based on an existing PIT entry or based on the arrival interface on which the interest was received.

If a matching content object is not found in the CS (decision 306), the system performs a lookup in the pending interest table (PIT) for a matching entry (operation 308). If a matching entry is found in the PIT (decision 310), the system adds the arrival interface of the interest to the matching entry (operation 312). In some embodiments, if the interest is a retransmission request (or a retry interest), wherein the arrival interface already exists in the matching PIT entry, the system may forward the interest. The system may also perform other functionality, such as interest aggregation, based on policies for PIT behavior.

If the matching entry is not found in the PIT (decision 310), the system adds to the pending interest table a first entry which indicates the interest based on the attributes and values of the interest (operation 314). A PIT entry can include attributes such as a name, a key identifier restriction (KIR), a content object hash restriction (COHR), and a set of arrival interfaces. An attribute can have one or more values, as described above in relation to FIG. 2C.

Intermediate Router/Other Forwarding Device Processes a Content Object

Figure 3B:
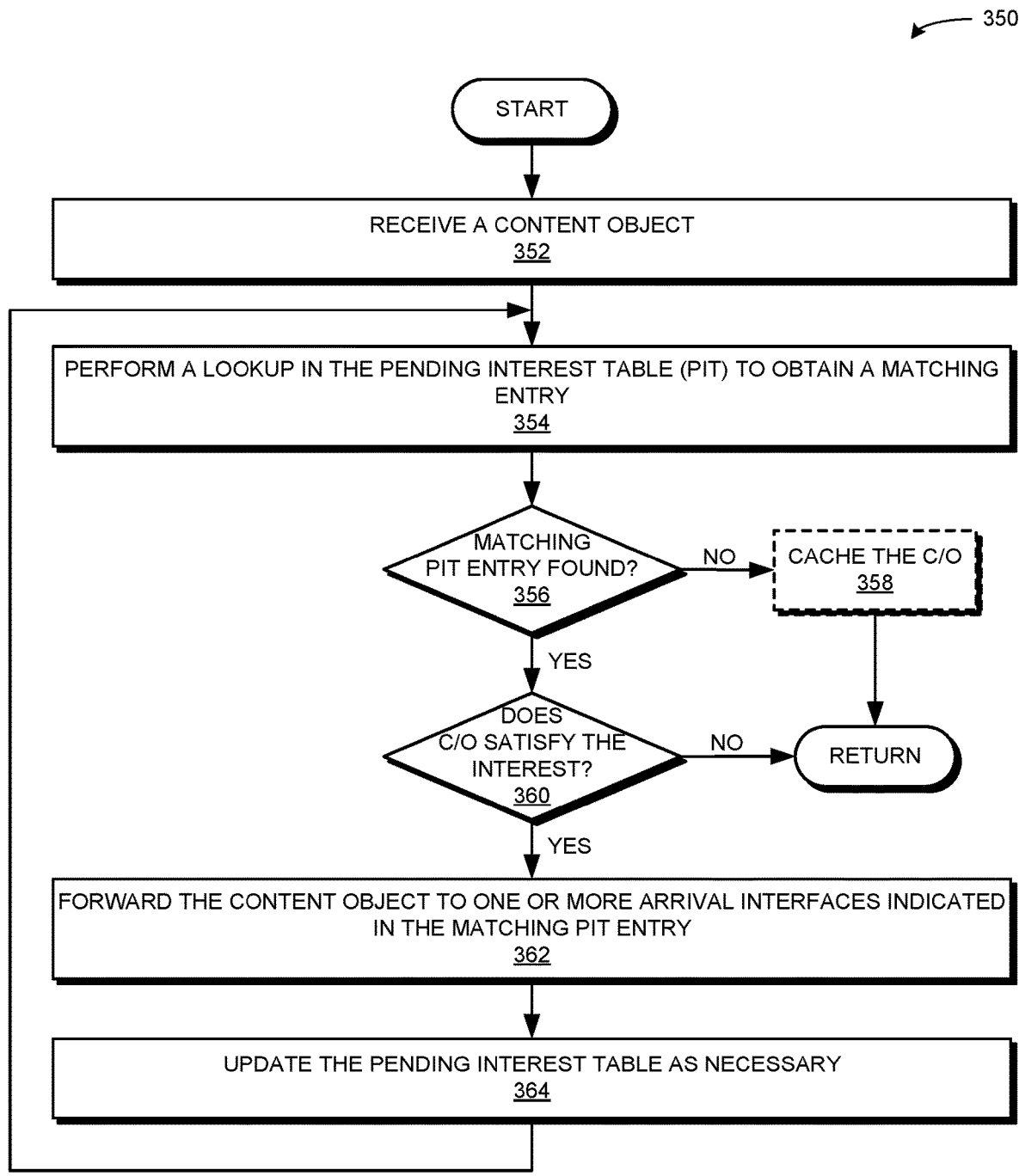
FIG. 3B presents a flow chart illustrating a method for facilitating a flexible strategy for matching content objects to interests, including processing an incoming content object, in accordance with an embodiment of the present invention.

FIG. 3B presents a flow chart 350 illustrating a method for facilitating a flexible strategy for matching content objects to interests, including processing an incoming content object, in accordance with an embodiment of the present invention. During operation, the system receives a content object (operation 352). The content object may or may not include a name which is a hierarchically structured variable length identifier comprising contiguous name components ordered from a most general level to a most specific level. Nameless content objects are described in U.S. patent application Ser. No. 14/337,026. The system performs a lookup in the pending interest table (PIT) to obtain a matching entry (operation 354). If a matching PIT entry is not found (decision 356), the system can optionally cache the content object, e.g., in a CS or local cache (operation 358). The system can refrain from forwarding the content object, discard the content object, or perform other functionality based on system policies.

If a matching PIT entry is found (decision 356), the system determines whether the content object satisfies the interest (decision 360). For example, the system can determine, for each attribute indicated in the matching PIT entry, whether a value of the corresponding attribute of the content object matches one of the values of a respective attribute indicated in the matching PIT entry, as described below in relation to FIG. 4. If the content object does not satisfy the interest (decision 360), the operation returns.

If the content object does satisfy the interest (decision 360), the system forwards the content object to one or more arrival interfaces indicated in the matching PIT entry (operation 362). The system updates the pending interest table as necessary (operation 364). For example, the system can remove the one or more arrival interfaces from the matching PIT entry (i.e., the interfaces via which the system forwarded the content object). The system can also remove the matching PIT entry if no more arrival interfaces are indicated in the PIT entry. The operation then returns to operation 354. The system continues to search for matching PIT entries. For example, in the communication depicted in FIG. 1C, node 110 can receive content object 170, and then obtain, match, and remove entry 140.1. Node 110 can continue to search for matching PIT entries, and obtain, match, and remove entry 140.2. This process may continue until no more matching PIT entries are found in the PIT, i.e., until no more PIT entries include values and attributes that satisfy the CNF formula based on the multiple values and attributes of the content object.

Figure 4:
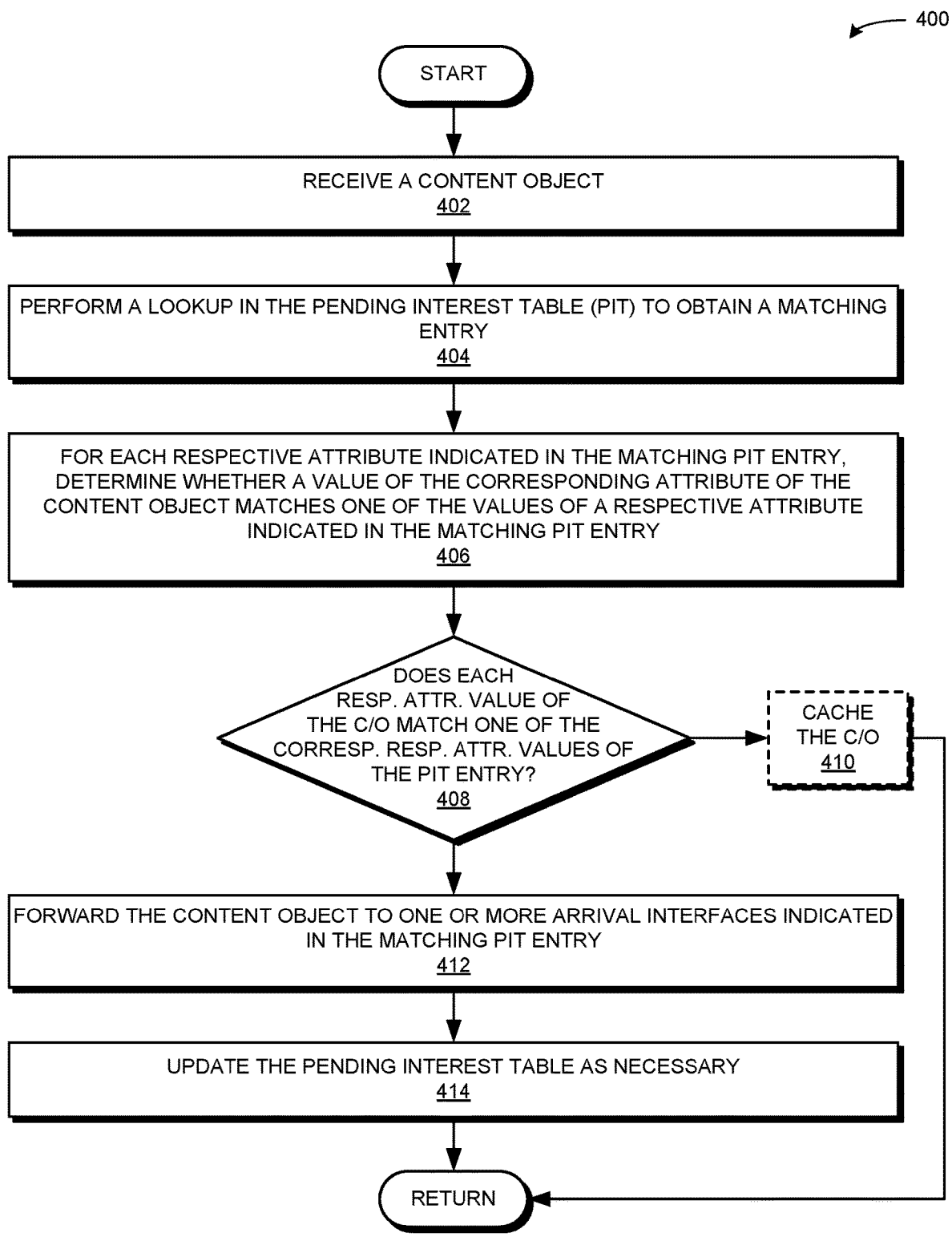
FIG. 4 presents a flow chart illustrating a method for facilitating a flexible strategy for matching content objects to interests, including processing an incoming content object and determining whether the content object satisfies a pending interest, in accordance with an embodiment of the present invention.

FIG. 4 presents a flow chart 400 illustrating a method for facilitating a flexible strategy for matching content objects to interests, including processing an incoming content object and determining whether the content object satisfies a pending interest, in accordance with an embodiment of the present invention. During operation, the system receives a content object (operation 402), which may or may not include a name (similar to operation 302). The system performs a lookup in the pending interest table (PIT) to obtain a matching entry (operation 404). For each respective attribute indicated in the matching PIT entry, the system determines whether a value of the corresponding attribute of the content object matches one of the values of a respective attribute indicated in the matching PIT entry (operation 406). For all attributes indicated in the PIT entry, if each respective attribute value of the content object does not match one of the corresponding respective attribute values of the PIT entry (decision 408), the system can cache the content object (operation 410, and as described above for operation 358).

For all attributes indicated in the PIT entry, if each respective attribute value of the content object does match one of the corresponding respective attribute values of the PIT entry (decision 408), the system forwards the content object to one or more arrival interfaces indicated in the matching PIT entry (operation 412). The system updates the pending interest table as necessary (operation 414, and as described above for operation 364).

Content Requesting Device Generates an Exemplary Interest

Figure 5:
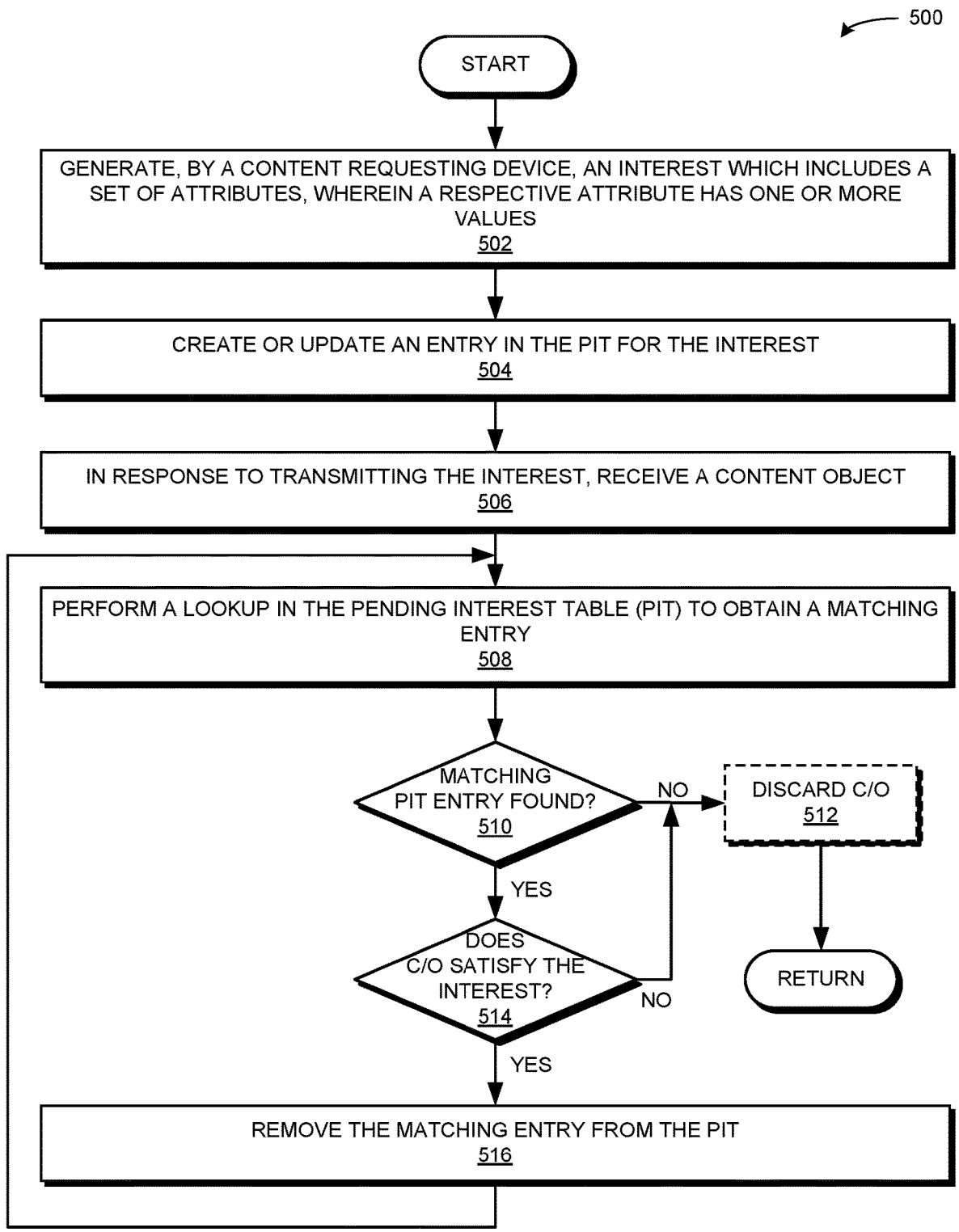
FIG. 5 presents a flow chart illustrating a method by a content requesting device for facilitating a flexible strategy for matching content objects to interests, in accordance with an embodiment of the present invention.

FIG. 5 presents a flow chart 500 illustrating a method by a content requesting device for facilitating a flexible strategy for matching content objects to interests, in accordance with an embodiment of the present invention. During operation, the system generates, by a content requesting device, an interest which includes a set of attributes, wherein a respective attribute has one or more values (operation 502). The system creates or updates an entry in the pending interest table (PIT) for the interest (operation 504). In response to transmitting the interest, the system receives a content object (operation 506), which may or may not include a name (similar to operation 302). The system performs a lookup in the pending interest table (PIT) to obtain a matching entry (operation 508). If a matching PIT entry is not found (decision 510), the system can optionally discard the content object (operation 512). The system can also cache the content object or perform other functionality based on system policies.

If a matching PIT entry is found (decision 510), the system determines whether the content object satisfies the interest (decision 514). For example, the system can determine, for each attribute indicated in the matching PIT entry, whether a value of the corresponding attribute of the content object matches one of the values of a respective attribute indicated in the matching PIT entry, as described above in relation to FIG. 4. If the content object does not satisfy the interest (decision 514), the system can optionally discard the content object (operation 512), and the operation returns.

If the content object does satisfy the interest (decision 514), the system removes the matching entry from the PIT (operation 516). The operation then returns to operation 508. The system continues to search for matching PIT entries. For example, in the communication depicted in FIG. 1C, node 110 can receive content object 170. As described above in relation to operations 364 and 354 of FIG. 3B, node 110 can first obtain, match, and remove entry 140.1, continue to search for matching PIT entries, and subsequently obtain, match, and remove entry 140.2. This process may continue until no more matching PIT entries are found in the PIT, i.e., until no more PIT entries include values and attributes that satisfy the CNF formula based on the multiple values and attributes of the content object.

The operations described above in relation to FIGS. 3A, 3B, and 4 can be performed by any computing device, entity, or node with a forwarder component, including a content requesting device (e.g., device 116 in FIG. 1A), an intermediate router (e.g., node 110 in FIG. 1A), and a content producing device (e.g., device 118 in FIG. 1A). In addition, the operations described above in relation to FIG. 5 can be performed by any content requesting device (such as device 116 in FIG. 1), or by any intermediate router that is acting as a content requesting node (e.g., node 110 In FIG. 1).

Exemplary Computer System

Figure 6:
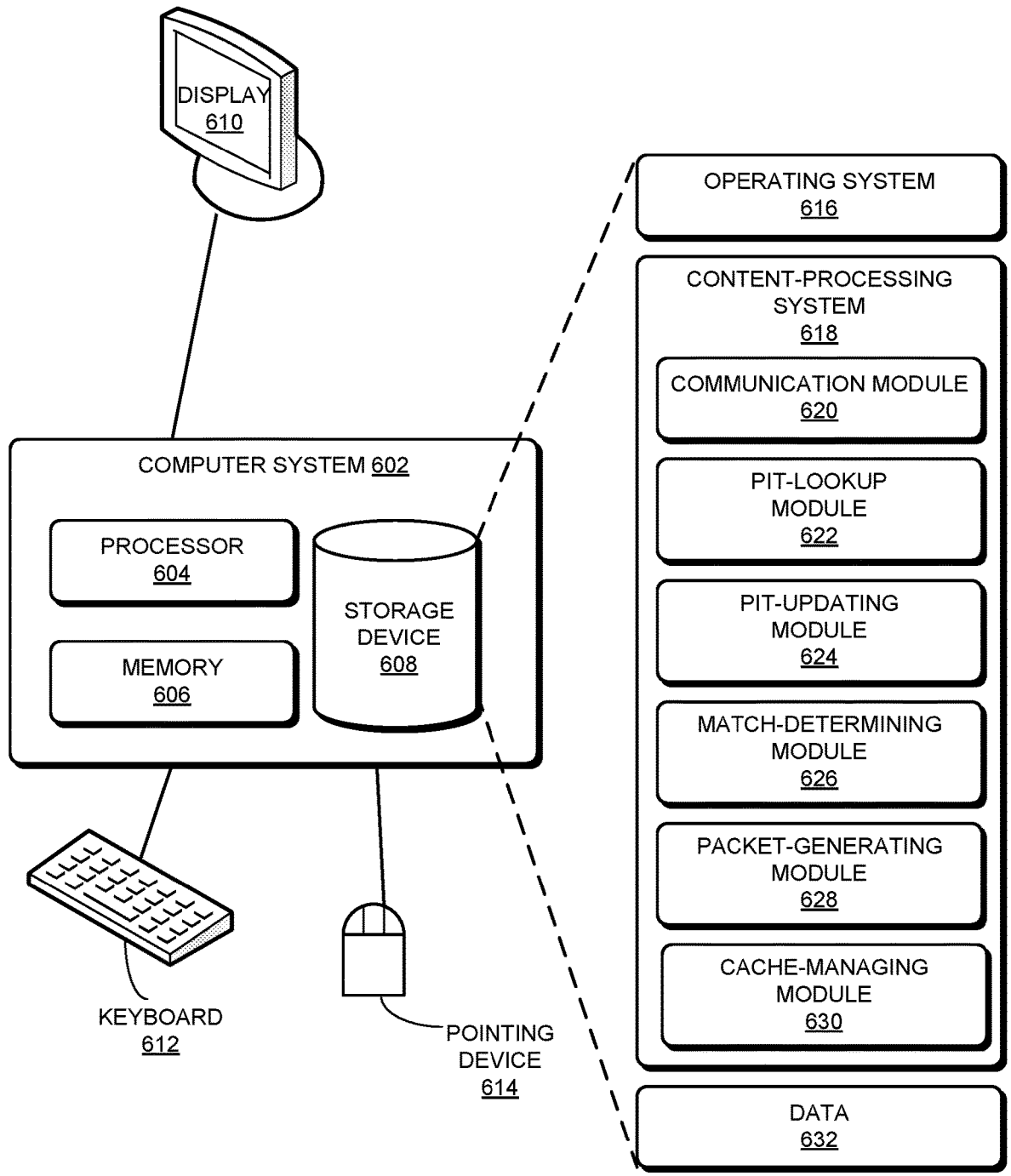
FIG. 6 illustrates an exemplary computer and communication system that facilitates a flexible strategy for matching content objects to interests, in accordance with an embodiment of the present invention.

FIG. 6 illustrates an exemplary computer and communication system 602 that facilitates a flexible strategy for matching content objects to interests, in accordance with an embodiment of the present invention. Computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a content-processing system 618, and data 632.

Content-processing system 618 can include instructions, which when executed by computer and communication system 602, can cause computer and communication system 602 to perform methods and/or processes described in this disclosure. Specifically, content-processing system 618 may include instructions for receiving an interest which includes a set of attributes, wherein a respective attribute has one or more values (communication module 620). Content-processing system 618 can also include instructions for, in response to not obtaining a matching entry for the interest in a PIT (PIT-lookup module 622), adding to the PIT a first entry which indicates the interest based on the attributes and their values (PIT-updating module 624). Content-processing system 618 can include instructions for determining whether a received content object satisfies the interest indicated in the first entry based on the attributes of the first entry and attributes of the content object (match-determining module 626). Content-processing system 618 can further include instructions for, in response to determining that the content object satisfies the interest (match-determining module 626), forwarding the content object (communication module 620). Content-processing system 618 can include instructions for receiving the content object (communication module 620), and performing a lookup in the PIT based on a name for the content object to obtain the first entry (PIT-lookup module 622).

Content-processing system 618 can additionally include instructions for, in response to determining, for each attribute indicated in the matching entry, that the values of a respective attribute indicated in the matching entry exactly match all of the values of the corresponding attribute of the interest (match-determining module 626), adding an arrival interface associated with the interest to a list of arrival interfaces for the matching entry (PIT-updating module 624). Content-processing system 618 can include instructions for, in response to determining, for each attribute indicated in the matching entry, that the values of a respective attribute indicated in the matching entry do not exactly match all of the values of the corresponding attribute of the interest (match-determining module 626), adding to the pending interest table the first entry (PIT-updating module 624). Content-processing system 618 can also include instructions for determining, for each attribute indicated in the first entry, that a value of the corresponding attribute of the content object matches one of the values of a respective attribute indicated in the first entry (match-determining module 626), and for performing a calculation based on a conjunctive normal form (match-determining module 626).

Furthermore, content-processing system 618 can include instructions for, in response to determining that the content object does not satisfy the interest (match-determining module 626): storing the content object in a local cache or content store (cache-managing module 630); refraining from forwarding the content object to a downstream node (communication module 620); discarding the content object (cache-managing module 630); and performing an action based on a policy of the computer system (match-determining module 626).

Content-processing system 618 can also include instructions for, in response to receiving the interest, performing a lookup in a content store or local cache of the computing device for a matching content object (cache-managing module 630). Content-processing system 618 can include instructions for, in response to determining, for each respective attribute indicated in the interest, that a value of an attribute of the matching content object matches one of the values of a corresponding respective attribute of the interest (match-determining module 626), forwarding the content object (communication module 620).

Content-processing system 618 can additionally include instructions for generating an interest which includes a set of attributes, wherein a respective attribute has one or more values (packet-generating module 628). Content-processing system 618 can include instructions for determining that a received content object satisfies the interest based on a matching entry in a PIT and further based on attributes of the matching entry and attributes of the received content object (match-determining module 626). Content-processing system 618 can include instructions for removing the matching entry from the PIT (PIT-updating module 624). Content-processing system 618 can also include instructions for creating the matching entry in the PIT (PIT-updating module 624).

Data 632 can include any data that is required as input or that is generated as output by the methods and/or processes described in this disclosure. Specifically, data 632 can store at least: a packet that corresponds to an interest or a content object; an interest; a content object; a name; a name for an interest or a content object; a hierarchically structured variable length identifier comprised of contiguous name components ordered from a most general level to a most specific level; an attribute associated with an interest or a content object; one or more values for an attribute; a key identifier restriction (KIR); a KIR associated with an interest; a key identifier associated with a content object; a content object hash restriction (COHR); a COHR associated with an interest; a content object hash (COH); a hop count or limit associated with the interest or the content object; any field of the interest, the content object, or a message in a content centric network; a pending interest table (PIT); a PIT entry; and a PIT entry with a name, a KIR, a COHR, and a list of arrival interfaces.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, comprising:
   a processor; and
   a storage device storing instructions that when executed by the processor cause the processor to perform a method, the method comprising:
      receiving an interest which includes a set of attributes, wherein an attribute from among the set of attributes is a restrictive attribute that is related to a content object and has a plurality of values;
      obtaining or not obtaining a matching entry for the interest in a pending interest table;
      based on not obtaining the matching entry for the interest in the pending interest table, adding to the pending interest table a first entry which indicates the interest based on the attributes and respective values thereof;
      determining whether the content object satisfies the interest indicated in the first entry based on the attributes of the first entry and attributes of the content object such that the content object satisfies the restrictive attribute from among the set of attributes of the interest based on the content object matching one value from among the plurality of values of the restrictive attribute; and
      based on the determining that the content object satisfies the interest, forwarding the content object.

2. The computer system of claim 1, wherein the interest has a name and wherein obtaining or not obtaining the matching entry in the pending interest table is based on the name for the interest, wherein the content object has a same name as the name for the interest, and wherein the method further comprises:
   receiving the content object; and
   performing a lookup in the pending interest table based on the name for the content object to obtain the first entry.

3. The computer system of claim 2, wherein in response to the obtaining the matching entry for the interest in the pending interest table based on the name for the interest, the method further comprises:
   in response to the determining, for each attribute indicated in the matching entry, that the values of a respective attribute indicated in the matching entry exactly match all of the values of the attribute of the interest, adding an arrival interface associated with the interest to a list of arrival interfaces for the matching entry; and
   in response to the determining, that the values of the respective attribute indicated in the matching entry do not exactly match all of the values of the set of attributes of the interest, adding to the pending interest table the first entry.

4. The computer system of claim 1, wherein the determining that the content object satisfies the interest further comprises:
   determining, for each attribute indicated in the first entry, that a value of a first attribute of the content object matches one of the values of a respective first attribute indicated in the first entry.

5. The computer system of claim 1, wherein the determining that the content object satisfies the interest further comprises:
   performing a calculation based on a conjunctive normal form, wherein the attribute comprises an AND clause, and wherein the values for the attribute comprise predicates of an OR clause.

6. The computer system of claim 1, wherein in response to the determining that the content object does not satisfy the interest, the method further comprises one or more of:
   storing the content object in a local cache or content store;
   refraining from forwarding the content object to a downstream node;
   discarding the content object; and
   performing an action based on a policy of the computer system.

7. The computer system of claim 1, wherein the set of attributes includes at least two of:
   a name for the interest or the content object, wherein the name is a hierarchically structured variable length identifier that includes contiguous name components ordered from a most general level to a most specific level;
   a key identifier restriction associated with the interest and applicable to a responsive content object;
   a key identifier associated with the content object;
   a content object hash restriction associated with the interest and applicable to the responsive content object;
   a hash of the content object;
   a hop count or limit associated with the interest or the content object; and
   any field of the interest, the content object, or a message in a content centric network.

8. The computer system of claim 1, wherein the method further comprises:
   in response to receiving the interest, performing a lookup in a content store or local cache of a computing device for a matching content object; and
   in response to determining, for each respective attribute indicated in the interest, that a value of the attribute of the matching content object matches one of the values of the respective attribute of the interest, forwarding the content object.

9. The computer system of claim 1, wherein the processor determines whether the content object satisfies the interest indicated in the first entry by determining whether a key identifier value or an object hash value of the content object matches the one value from among the plurality of values of the restrictive attribute of the interest.

10. The computer system of claim 1, wherein the restrictive attribute is one of:
   a key identifier restriction associated with the interest and applicable to a responsive content object;
   a key identifier associated with the content object;
   a content object hash restriction associated with the interest and applicable to the responsive content object; or
   a hash of the content object.

11. A computer-implemented method, comprising:
receiving an interest which includes a set of attributes, wherein an attribute from among the set of attributes is a restrictive attribute that is related to a content object and has a plurality of values;
obtaining or not obtaining a matching entry for the interest in a pending interest table;
based on not obtaining the matching entry for the interest in the pending interest table, adding to the pending interest table a first entry which indicates the interest based on the attributes and respective values;
determining whether the content object satisfies the interest indicated in the first entry based on the attributes of the first entry and attributes of the content object such that the content object satisfies the restrictive attribute from among the attributes of the interest based on the content object matching one value from among the plurality of values of the restrictive attribute of the interest; and
based on the determining that the content object satisfies the interest, forwarding the content object.

12. The computer-implemented method of claim 11, wherein the interest has a name, wherein obtaining or not obtaining the matching entry in the pending interest table is further based on the name for the interest, wherein the content object has a same name as the name for the interest, and wherein the method further comprises:
receiving the content object; and
performing a lookup in the pending interest table based on the name for the content object to obtain the first entry.

13. The computer-implemented method of claim 12, wherein in response to the obtaining the matching entry for the interest in the pending interest table based on the name for the interest, the method further comprises:
in response to the determining, for each attribute indicated in the matching entry, that the values of a respective attribute indicated in the matching entry exactly match all of the values of the respective attribute of the interest, adding an arrival interface associated with the interest to a list of arrival interfaces for the matching entry; and
in response to the determining, that the values of the respective attribute indicated in the matching entry do not exactly match all of the values of the set of attributes of the interest, adding to the pending interest table the first entry.

14. The computer-implemented method of claim 11, wherein the determining that the content object satisfies the interest further comprises:
determining, for each attribute indicated in the first entry, that a value of a first attribute of the content object matches one of the values of a respective first attribute indicated in the first entry.

15. The computer-implemented method of claim 11, wherein the determining that the content object satisfies the interest further comprises:
performing a calculation based on a conjunctive normal form, wherein the attribute comprises an AND clause, and wherein the values for the attribute comprise predicates of an OR clause.

16. The computer-implemented method of claim 11, wherein in response to the determining that the content object does not satisfy the interest, the method further comprises one or more of:
storing the content object in a local cache or content store;
refraining from forwarding the content object to a downstream node;
discarding the content object; and
performing an action based on a policy.

17. A computer system, comprising:
a processor; and
a storage device storing instructions that when executed by the processor cause the processor to perform a method, the method comprising:
generating an interest which includes a set of attributes, wherein an attribute from among the set of attributes is a restrictive attribute that is related to a content object and has a plurality of values;
determining that the content object satisfies the interest based on a matching entry in a pending interest table and further based on attributes of the matching entry and attributes of the content object such that the content object satisfies the restrictive attribute from among the attributes of the interest based on the content object matching one value from among the plurality of values of the restrictive attribute of the interest; and
removing the matching entry from the pending interest table.

18. The computer system of claim 17, wherein the method further comprises:
creating the matching entry in the pending interest table, wherein the matching entry indicates the interest based on the attributes and respective values thereof.

19. The computer system of claim 17, wherein the interest has a name that is a hierarchically structured variable length identifier comprised of contiguous name components ordered from a most general level to a most specific level.

20. The computer system of claim 17, wherein the method further comprises:
in response to transmitting the interest, receiving the content object,
wherein the determining that the content object satisfies the interest based on the matching entry further comprises:
determining, for each attribute indicated in the matching entry, that a value of a corresponding attribute of the content object matches one of the values of the corresponding attribute indicated in the matching entry.

* * * * *